United States Patent
Kontrec et al.

(10) Patent No.: US 7,018,537 B2
(45) Date of Patent: Mar. 28, 2006

(54) CHIRAL STATIONARY PHASES BASED ON DERIVATIVES OF 4-AMINO-3,5-DINITROBENZOIC ACID

(75) Inventors: Darko Kontrec, Zagreb (HR); Vladimir Vinkovic, Zagreb (HR); Vitomir Sunjic, Zagreb (HR); Paolo Mariotti, Cervignano del Friuli (IT); Luciano Navarini, Trieste (IT)

(73) Assignee: Chirallica d.o.o., (HR)

( * ) Notice: Subject to any disclaimer, the term of this patent is extended or adjusted under 35 U.S.C. 154(b) by 118 days.

(21) Appl. No.: 10/469,899

(22) PCT Filed: Mar. 6, 2002

(86) PCT No.: PCT/EP02/02437

§ 371 (c)(1),
(2), (4) Date: Feb. 24, 2004

(87) PCT Pub. No.: WO02/070124

PCT Pub. Date: Sep. 12, 2002

(65) Prior Publication Data

US 2004/0144708 A1   Jul. 29, 2004

(30) Foreign Application Priority Data

Mar. 7, 2001   (IT) .......................... MI2001A0473

(51) Int. Cl.
*B01D 15/08* (2006.01)
(52) U.S. Cl. .................. 210/635; 210/656; 210/198.2; 210/502.1; 502/401; 502/402; 502/439
(58) Field of Classification Search ................ 210/635, 210/656, 659, 198.2, 502.1; 502/401, 402, 502/439
See application file for complete search history.

(56) References Cited

U.S. PATENT DOCUMENTS

| 4,324,681 | A |   | 4/1982  | House |              |
|-----------|---|---|---------|-------|--------------|
| 4,963,254 | A | * | 10/1990 | Oi et al. ................. | 210/198.2 |
| 5,290,440 | A |   | 3/1994  | Pirkle et al. |       |
| 5,487,831 | A | * | 1/1996  | Pirkle et al. ............. | 210/198.2 |

FOREIGN PATENT DOCUMENTS

| EP | 0299793  | 1/1989 |
| EP | 00/00464 | 1/2000 |

OTHER PUBLICATIONS

Malyshev, Journal of Chromatography, A, 859 (1999) 143-151.*
Database CA Online, Chemical Abstracts Service, Columbus, Ohio, US Malyshev, O.R. et al., "Convenient synthesis of .pi.-acceptor chiral stationary phases for high-performance liquid chromatography from halogen-substituted 3,5-dinitrobenzoylamides" retrieved from STN Database accession No. 132:585521 CA, XP002203996 abstract.

(Continued)

*Primary Examiner*—Ernest G. Therkorn
(74) *Attorney, Agent, or Firm*—Thompson Hine LLP (57) ABSTRACT

The invention describes new chiral stationary phases containing a 4-amino-3,5-dinitrobenzoic unit modified with chiral groups and spacer groups. The invention includes the process for the preparation of said stationary phases starting from 4-halogenated derivative of 3,5-dinitrobenzoic acid, chiral selectors obtainable as intermediates in the aforesaid process, and the use of the chiral stationary phases in the separation of enantiomers.

17 Claims, 4 Drawing Sheets

OTHER PUBLICATIONS

Maier, N.M. et al., "Diphenylethanediamine derivatives as chiral selections V.[I] Efficient normal-phase high-performance liquid chromatographic enantioseparation of underivatized chiral arylalcohols on four differently linked 3,5-dinitrobenzoyldiphenylethanediamine-derived chiral stationary phases," *Journal of Chromatography A*, 732, pp. 215-230 (1996).

Kontrec, D. et al., "Preparation and Evaluation of Chiral Stationary Phases Based on N,N-2,4-(or4,6)-Disubstituted 4,5-(or 2,5)-Dichloro-1,3-Dicyanobenzene," *Chirality*, 12, pp. 63-70 (2000).

Pirkle, W.H. et al., "A New, Easily Accessible Reciprocal Chiral Stationary Phase fo rthe Chromatolographic Separation of Enantiomers," *J. Am. Chem. Soc.*, 108, pp. 352-354 (1986).

Welch, C.J., "Evolution of chiral stationary phase design in the Pirkle laboratories," *J. Chromatogr.*, A 666, pp. 3-26 (1994).

Perrin, S.R. et al., "Commerically Available Brush-Type Chiral Selectors fo rthe Direct Resolution of Enantiomers," *Chiral Separations by Liquid Chromatography*, American Chemical Society, pp. 43-66 (1991).

Eliel, E. L. et al., "Separation of Stereoisomers. Resolution. Racemization." *Stereochemistry of Organic Compounds*, published by John Wiley & Sons, Inc., pp. 297-314.

Bayley, C.R. et al., "Resolution of Racemates by Diastereomeric Salt Formation," *Chirality in Industry*, published by John Wiley & Sons Ltd., pp. 69-77 (1992).

Nógrádi, M., "Principles relating to the separation of enantiomers," *Stereochemistry Basic Concepts & Applications*, Akadémiai Kiadó, Budapest, pp. 87-90 (1981).

* cited by examiner

CHIRAL STATIONARY PHASES BASED ON DERIVATIVES OF 4-AMINO-3,5-DINITROBENZOIC ACID

REFERENCE TO RELATED APPLICATIONS

This application is a 371 of PCT/EP02/02437 filed Mar. 6, 2002.

FIELD OF THE INVENTION

The present invention concerns the field of chromatographic separations of racemic mixtures; the invention describes stationary phases usable in said separations.

STATE OF THE ART

Different techniques are known for the separation of enantiomers. These are well known to the persons skilled in the art and include the fractional crystallization of acidic or basic racemic salts in the presence of equivalent amounts of the chiral base or acid (M. Nogradi, "Stereochemistry, Basic Concepts & Applications", Akademiai Kiado, Budapest, 1981, pp. 87–90; C. R. Bayley, N. A. Vaidya, Resolution of Racemi by Diastereomeric Salt Formations, in A. N. Collins, G. N. Sheldrake, and J. Crosby (Editors), Chirality in Industry, 1992, pp. 69–78), and the separation of racemi after conversion into a mixture of diastereoisomers. These diastereoisomers are separated by exploiting their various physical properties. However, once separated, for instance through crystallization on an achiral support, the diastereoisomers must be converted into the corresponding enantiomers; the process has the disadvantage therefore of requiring additional chemical transformations (E. L. Eliel, S. H. Wilen, L. N. Meer, "Stereochemistry of Organic Compounds", John. Wiley & Sons, Inc., 1994, pp. 207–314).

The current methods, the so-called direct methods, for the separation of enantiomers exclusively involve the transient formation of the diastereomeric species. In the main application of the direct method, the racemic mixture or the enriched mixture is made to interact with the chiral stationary phase (CSP) that is used in a chromatographic column. The enantiomer that interacts most strongly with the chiral stationary phase has a greater retention time whereas the other enantiomer is eluted first. Examples of chiral stationary phases include the polymeric chiral materials, mainly the biopolymers such as, for example, polysaccharides and proteins, and those based on synthesized chiral organic molecules of low molecular weight bound to an achiral support (Pirkle, W. H. and Perrin, S. "Commercially available brush-type chiral selectors for the direct resolution of enantiomers" (in "Chiral separation by liquid chromatography", Ahuja, S.; Ed., ACS Symposium Series 471: 43–68, 1991) and by Welch, C. J. "Evaluation of chiral stationary phases design in the Pirkle laboratories"; J. Chromatogr. A 666: 3–26, 1994.)

A class of stationary phases belonging to the synthesized chiral organic molecules bound to an achiral support includes the phases whose structure contains 3,5-dinitrobenzoyl (3,5-DNB) as a terminal group. These CSP are described in the scientific literature (J. Pirkle, J. Am. Chem. Soc. 1986, 108, 352), and in patents (U.S. Pat. No. 5,290, 440), and are besides commercially available. These phases are characterized by the presence of the 3,5-DNB group in a terminal position, which is the unit exposed to the interaction with the analytes. They are represented by the general formula A:

Some specific examples of derivatives of 3,5-DNB are: (L)-N-(3,5-dinitrobenzoyl)leucine, (L)-N-(3,5-dinitrobenzoyl)phenylglycine. The 3,5-DNB group is a $\pi$-acid unit and is bound to an enantiomerically pure $\alpha$-amino acid by an amidic bond. Such structure, although effective in the enantioseparation of some racemi, does not allow the enantioseparation of the vast number of racemi that interact with the CSP by means of $\pi$—$\pi$ type additional interactions or by means of hydrogen bond type interactions.

Another class of CSP that belongs to the group of stationary phases based on synthesized chiral organic molecules bound to an achiral support includes the derivatives of 1,3-dicyanobenzene, represented by the general formula B:

in which A is a chiral group bound to an aromatic ring via a nitrogen atom, and B is a chlorine atom or a chiral group bound to an aromatic ring via a nitrogen atom.

These CSP are commercially available and have been described in the scientific literature (D. Kontrec. et al, Chirality, 2000, 12, 63–70) and in patents (WO00/00464). They are characterized by the presence of the units 1,3-dicyano-2,5-dichloro-benzene or 1,3-dicyano-5-chloro-benzene that include two or three amino-substituted groups respectively. These CSP also have limitations with regard to different classes of separable analytes.

An increasing number of new racemic mixtures of the most varied structures has recently been proposed for resolution into enantiomers: this is due inter alia to the increased ability of industry to synthesize or extract new active molecules, and to the current regulatory requirements that impose enantiomeric purity standards.

In this situation, the above-mentioned CSP, whose main disadvantage lies in their impossibility of resolving different classes of analytes, prove increasingly less agreeable. Hence the increasingly urgent need to prepare new CSP having high separation efficacy, and which are capable of resolving additional classes of analytes.

SUMMARY

The invention describes new chiral stationary phases containing chiral selectors consisting in a 4-amino-3,5-dinitrobenzoic unit modified with chiral groups and bound to a solid support by means of spacer groups. The invention includes the process for the preparation of said stationary phases starting from 4-halogenated derivatives of 3,5-dinitrobenzoic acid, chiral selectors obtainable as intermediates in the aforesaid process, and the use of the chiral stationary phases in the separation of enantiomers.

DESCRIPTION OF THE FIGURES

FIG. 1.*a*: Chemical structure of the stationary phases CSP I-CSP XI

FIG. 1.*b*: Chemical structure of the stationary phases CSP XI-CSP XIX

DETAILED DESCRIPTION OF THE INVENTION

The present invention concerns chiral stationary phases (CSP) having broad separation spectrum, represented by the structure (I):

in which:
P is:
(i): a chiral group in an enantiomerically pure form, chosen between:
—$(CH_2)_n$NHCOCH($R^1$)NH($R^2$) where:
n ranges from 2 to 4, $R^1$ is $C_1$–$C_5$ linear or branched alkyl, aryl; $R^2$ is COAr or Ar, where Ar is an aryl or alkylaryl group, optionally substituted with one or more groups chosen among: $NO_2$, CN, Cl, $CH_3$, $OCH_3$
—COCH($R^1$)NH($R^2$) where:
$R^1$ and $R^2$ are defined as above;
(ii) or P is a spacer group covalently bound to a solid support for chromatography
Q is:
(i) a chiral group in an enantiomerically pure form, chosen among:
—CHR$^{10}$R$^{11}$ where:
$R^{10}$ is H, $C_1$–$C_5$ linear or branched alkyl; $R^{11}$ is cycloalkyl, arylalkyl, aryl, optionally substituted with one or more groups chosen among: $NO_2$, CN, Cl, $CH_3$, $OCH_3$.
—CH($R^{13}$)CONH($R^{14}$) where:
$R^{13}$ is H, $C_1$–$C_5$ linear or branched alkyl, aryl, optionally substituted with $NO_2$, CN, Cl, $CH_3$, $OCH_3$; $R^{14}$ is alkylaryl, aryl, optionally substituted with one or more groups chosen among: $NO_2$, CN, Cl, $CH_3$, $OCH_3$.
—CH($R^3$)CH($R^4$)(NHR$^5$) where:
$R^3$ and $R^4$ independently of each other are $C_1$–$C_5$ linear or branched alkyl, aryl, alkylaryl, optionally substituted with $NO_2$, CN, Cl, $CH_3$, $OCH_3$, or $R^3$ forms, with $R^4$ and with the carbon atoms bound to $R^3$ and $R^4$, a 5–6 term ring; $R^5$ is an aryl, benzoyl group, optionally substituted with one or more groups chosen among: $NO_2$, CN, Cl, $CH_3$, $OCH_3$.
—CH[CH($R^{17}$)($R^7$)][$R^9$] where:
$R^9$ is OH, —CHR$^8$R$^6$ or phenyl; $R^{17}$ is H or OH, $R^7$ is H, $C_1$–$C_5$ linear or branched alkyl, or $R^7$ forms with $R^8$ and with the carbon atoms bound to $R^7$ and $R^8$ a 5–6 term ring;

$R^8$ is H, $C_1$–$C_5$ linear or branched alkyl, phenyl, or $R^8$ forms with $R^6$ and with the carbon atoms bound to $R^8$ and $R^5$ a 5–6 term ring optionally of aromatic nature; $R^6$ is H, $C_1$–$C_5$ linear or branched alkyl, hydroxyl;
(ii) or Q is a spacer group covalently bound to a solid support for chromatography, and in which, the aforesaid formula (I) always contains one chiral group and one spacer group bound to a solid support, defined as above.

Preferably the chiral group is represented by P and the spacer group is represented by Q.

The aforesaid chiral groups (whether P or Q) always have an asymmetrical carbon atom in (R) or (S) form.

In the formula (I), the alkylaryl group is preferably represented by the benzyl group; the aryl group is preferably represented by phenyl, naphthyl, 2,5,6-trichloro-1,3-dicyanophenyl or 4,5,6-trichloro-1,3-dicyanophenyl.

Within formula (I) it is possible to identify five subgroups of chiral stationary phases particularly useful for the purpose of the present invention.

(a) A first group of preferred chiral stationary phases is represented by the formula (I) where:
P is —$(CH_2)_n$NHCOCH($R^1$)NH($R^2$), n is 2; $R^1$ is methyl, isopropyl, isobutyl, phenyl, benzyl; $R^2$ is 3,5-dinitrobenzoyl, 2,5,6-trichloro-1,3-dicyanophenyl, 4,5,6-trichloro-1,3-dicyanophenyl.

(b) A second group of preferred chiral stationary phases is represented by the formula (I) where:
Q is —CHR$^{10}$R$^{11}$, $R^{10}$ is methyl; $R^{11}$ is cyclohexyl, phenyl, naphthyl, anthranyl, 2,5,6-trichloro-1,3-dicyanophenyl, 4,5,6-frichloro,1,3-dicyanophenyl, para-nitrophenyl;

(c) A third group of preferred chiral stationary phases is represented by the formula (I) where:
Q is —CH($R^{13}$)CONH($R^{14}$), $R^{13}$ is methyl, phenyl, isobutyl; $R^{14}$ is phenyl, dimethylphenyl;

(d) A fourth group of preferred chiral stationary phases is represented by the formula (I) where:
Q is —CH($R^3$)CH($R^4$)(NHR$^5$), $R^3$ and $R^4$ are phenyl or $R^3$ forms with $R^4$ and with the carbon atoms bound to $R^3$ and $R^4$ a 6-term ring; $R^5$ is 4,5,6-trichloro-1,3-dicyanophenyl, 2,4,6-trichloro-1,3-dicyanophenyl;

(e) A fifth group of preferred chiral stationary phases is represented by the formula (I) where:
Q is CH[CH($R^{17}$)($R^7$)][$R^9$] where:
$R^9$ is OH, —CHR$^8$R$^6$ or phenyl; $R^{17}$ is H or OH; $R^7$ is H, or $R^7$ forms with $R^8$ and with the carbon atoms bound to $R^7$ and $R^8$ a 5-term ring, or $R^8$ is H, methyl, phenyl, or $R^8$ forms with $R^6$ and with the carbon atoms bound to $R^6$ a 5–6 term ring of aromatic nature, $R^5$ is methyl, hydroxyl.

Among the aforesaid groups (a)–(e), group (a) is the most preferred.

The spacer group covalently bound to a solid support for chromatography preferably has the formula —$(CH_2)_n$—Si—($R^{12}$)($R^{16}$)—O—$R^{15}$ where n ranges from 1 to 10; $R^{12}$ and $R^{16}$ are $C_1$–$C_4$ alkyl, $C_1$–$C_4$ alkoxy, O—$R^{15}$, where $R^{15}$ represents the solid support for chromatography; the spacer groups are therefore bound to the solid support by mono or multifunctional covalent bonds.

The preferred spacer groups are those where $R^{12}$ is equal to $R^{16}$ and represents ethoxy, n is 3, and $R^{15}$ is a silyl group of silica, or those where $R^{12}$ is ethoxy and $R^{16}$ is —OR$^{15}$, and $R^{15}$ is a silyl group of silica.

The solid support is a support suitable for use in chromatographic separations and is preferably of inorganic nature. The solid supports for chromatography generally contain hydroxylic groups or other oxygenated groups that are known to form covalent bonds with functional groups thus obtaining functionalized supports. Therefore, the solid support is bound to the rest of the molecule of formula (I) by a covalent type bond that involves one among the aforesaid hydroxylated/oxygenated groups of the support. Examples of inorganic solid support are silica, silica gel, alumina, kaolin, titanium oxide, magnesium oxide, silicates, synthetic polymers.

An additional object of the present invention is a production process of the chiral stationary phases of formula (I).

Such process includes the following steps, applicable in any order:
introduction of a chiral group (P or Q) on the ring of a 4-halo-3,5-dinitro-benzoic acid;
introduction of a spacer group (Q or P) on the ring of the 4-halo-3,5-dinitrobenzoic acid;
formation of a covalent bond between the spacer group and the solid support.

When a chiral group is introduced in the aforesaid steps, the meaning of P or Q is chosen among those described with (i) in the formula (I); when a spacer group is introduced, the meaning of P or Q is that described with (ii) in the formula (I): preferably, the meaning of P is chosen among those denoted by (i), while the meaning of Q is that described with (ii).

In a more specific and preferred embodiment of the present process, the spacer group is first made to react with the solid support and then, once bonded to the solid support, with 4-halo-3,5-dinitro-benzoic acid;

The following is a first exemplification of this embodiment:
A. Introduction of a chiral group (P or Q) on the ring of the 4-halo-3,5-dinitro-benzoic acid, with formation of the aminic derivative (where P substitutes the halogen in position 4 of the benzoic ring), or with formation of the benzamidic derivative (where Q reacts with the carboxylic function of the aforesaid acid);
B. formation of the covalent bond between the spacer group and the solid support;
C. covalent bond between the spacer group bound to the solid support as obtained in step B., and the chiral selector obtained in step A, said bond being made on position 4 of the benzoic ring or on the carboxylic function, depending on which position has not reacted with the chiral group; this step allows the attainment of the chiral stationary phase.

This is the preferred way of synthesis for the compounds of formula (I) in which the chiral group is the group Q, and the spacer group is the group P.

In a second exemplification, the process includes the following steps:
A. formation of the covalent bond between the spacer group and the solid support;
B. covalent bond of the spacer group (bound to the solid support as obtained in step A) on the 4-halo-3,5-dinitro-benzoic acid with the formation of the corresponding aminic derivative (where the spacer group substitutes the halogen in position 4 of the benzoic ring) or of the benzamidic derivative (where the spacer group reacts with the carboxylic function of the aforesaid acid);
C. introduction of a chiral group (P or Q) on the 4-halo-3,5-dinitro-benzoic acid modified in step B., on position 4 of the benzoic ring or on the carboxylic function, depending on which position has not reacted with the spacer group; this step allows the formation of the chiral stationary phase.

This is the preferred way of synthesis for the compounds of formula (I) in which the chiral group is group P and the spacer group is group Q.

The starting reagent used for this process is a 4-halo-3, 5-dinitro-benzoic acid, in which the halogen in position 4 acts as a leaving group for subsequent reactions of nucleophilic substitution; a preferred example of such reagent is 4-chloro-3,5-dinitro-benzoic acid, commercially available.

The introduction of the groups P and Q (whether chiral or spacer) is carried out by reacting 4-halo-3,5-dinitro-benzoic acid with a compound of formula P-$NH_2$ or formula Q-$NH_2$ (where P and Q have the meanings indicated in formula (I), including the desired stereochemical configuration, when P or Q represent chiral groups). The reagent P-$NH_2$ substitutes the halogen of the 4-halo-3,5-dinitro-benzoic acid with the formation of the corresponding 4-aminic derivative (formula (Ia)). The reagent Q-$NH_2$ reacts with the carboxylic function of the 4-halo-3,5-dinitro-benzoic acid, leading to the formation of the corresponding benzamidic derivative (formula (Ib)). The formulas (Ia) and (Ib) are represented below:

in the formula (Ia), P is:
(i): a chiral group in an enantiomerically pure form, chosen between:
—$(CH_2)_n$NHCOCH($R^1$)NH($R^2$) where:
n ranges form 2 to 4, $R^1$ is $C_1$–$C_5$ linear or branched alkyl, aryl; $R^2$ is COAr or Ar, where Ar is an aryl or alkylaryl group, optionally substituted with one or more groups chosen among: $NO_2$, CN, Cl, $CH_3$, $OCH_3$
—COCH($R^1$)NH($R^2$) where:
$R^1$ and $R^2$ are defined as above;
(ii) or P is a spacer group, optionally covalently bound to a solid support for chromatography In the formula (Ib),
Hal is halogen,
Q is:
(i) a chiral group in an enantiomerically pure form, chosen among:
—CH$R^{10}R^{11}$ where:
$R^{10}$ is H, $C_1$–$C_5$ linear or branched alkyl; $R^{11}$ is cycloalkyl, arylalkyl, aryl, optionally substituted with one or more groups chosen among: $NO_2$, CN, Cl, $CH_3$, $OCH_3$.
—CH($R^{13}$)CONH($R^{14}$) where:
$R^{13}$ is H, $C_1$–$C_5$ linear or branched alkyl, aryl, optionally substituted with $NO_2$, CN, Cl, $CH_3$, $OCH_3$; $R^{14}$ is alkylaryl, aryl, optionally substituted with one or more groups chosen among: $NO_2$, CN, Cl, $CH_3$, $OCH_3$.
—CH($R^3$)CH($R^4$)(NH$R^5$) where:
$R^3$ and $R^4$ independently of each other are $C_1$–$C_5$ linear or branched alkyl, aryl, alkylaryl, optionally substituted with $NO_2$, CN, Cl, $CH_3$, $OCH_3$, or $R^3$ forms with $R^4$ and with the carbon atoms bound to $R^3$ and $R^4$ a 5–6 term ring; $R^5$ is an aryl, benzoyl group, optionally substituted with one or more groups chosen among: $NO_2$, CN, Cl, $CH_3$, $OCH_3$.
—CH[CH($R^{17}$)($R^7$)][$R^9$] where:

$R^9$ is OH, —$CHR^8R^6$ or phenyl; $R^{17}$ is H or OH; $R^7$ is H, $C_1$–$C_5$ linear or branched alkyl, or $R^7$ forms with $R^8$ and with the carbon atoms bound to $R^7$ and $R^8$ a 5–6 term ring; $R_8$ is H, $C_1$–$C_5$ linear or branched alkyl, phenyl, or $R^8$ forms with $R^6$ and with the carbon atoms bound to $R^8$ and $R^6$ a 5–6 term ring optionally of aromatic nature; $R^6$ is H, $C_1$–$C_5$ linear or branched alkyl, hydroxyl;

(ii) or Q is a spacer group, optionally covalently bound to a solid support for chromatography.

In the formula (Ia) or (Ib) the spacer group optionally bound to a solid support for chromatography preferably has the formula —$(CH_2)_n$—Si—$(R^{12})(R^{16})$—O—$R^{15}$, where n ranges from 1 to 10; $R^{12}$ and $R^{16}$ are $C_1$–$C_4$ alkyl, $C_1$–$C_4$ alkoxy, O—$R^{15}$, $R^{15}$=$R^{12}$, or $R^{15}$=$R^{16}$, or $R^{15}$=$R^{12}$=$R^{16}$, or (in the case in which the spacer group is covalently bonded to the solid support), $R^{15}$ represents the solid support. Examples of reagents that can be used to introduce the Q and P groups are α-amino acids, α-arylalkylamines, amides of carboxylic acid, amino alcohols, arylamines, alkylamines, arylalkylamines. Examples of specific reagents are: 1-phenylethylamine, proline, (l-(naphthyl-1-yl)ethylamine, phenylalanine, phenylglycine, n-butylamine, 3,5-dimethylaniline, cyclohexylethylamine, sarcosine, asparagine.

When P or Q represent the spacer group, the reagent used has the formula $H_2N$—$(CH_2)_n$—Si—$(R^{12})(R^{16})$—O—$R^{15}$, where n ranges form 1 to 10; $R^{12}$ and $R^{16}$ are $C_1$–$C_4$ alkyl, $C_1$–$C_4$ alkoxy, O—$R^{15}$, $R^{15}$=$R^{12}$, or $R^{15}$=$R^{16}$, or $R^{15}$=$R^{12}$=$R^{16}$, or (in case in which the spacer group is already covalently bonded to the solid support) $R^{15}$ represents the solid support. In the latter case, an example of an effective reagent is Nucleosil 100-5-$NH_2$ ("silica packings with chemically bonded $NH_2$ polar groups" supplied by Macherey Nagel).

The introduction of the P or Q groups (whether chiral or spacer) is carried out by heating the reagents P-$NH_2$ or Q-$NH_2$ in suitable solvents or in their mixtures, optionally in the presence of an excess of solvent. The operational temperature is between 20° C. and 120° C. and the reaction time is between 60 minutes and 80 hours. The preferred temperature interval is 20°–70° C. and the preferred reaction time interval is 2–16 hours.

The bond between the spacer group and the solid support is obtained according to known chemical reactions that include heating to high temperatures in the presence of a solvent or mixtures of organic solvents. The preferred conditions envisage the use of toluene, the reaction time is longer than 6 hours, preferably 16 hours, the reaction temperature is higher than 30° C., the reaction preferably takes place under reflux conditions.

A class of interesting compounds for the purposes of the invention is represented by the compounds of formula (Ia) or (Ib) in which the group P (formula (Ia)) or Q (formula (Ib)) is a chiral group as defined above. Such compounds, here defined as "chiral selectors", are new and have a specific function both as intermediates in the synthesis of the CSP, as well as functioning, inside the CSP, as an element of enantiomeric discrimination.

Such chiral selectors represent an additional object of the invention and are therefore defined by the structural formula (Ia)

in which:
P is chosen between:
a chiral group in an enantiomerically pure form, chosen between:
—$(CH_2)_n$NHCOCH($R^1$)NH($R^2$) where:
n ranges from 2 to 4, $R^1$ is $C_1$–$C_5$ linear or branched alkyl, aryl; $R^2$ is COAr or Ar, where Ar is an aryl or alkylaryl group, optionally substituted with one or more groups chosen among: $NO_2$, CN, Cl, $CH_3$, $OCH_3$
—COCH($R^1$)NH($R^2$) where:
$R^1$ and $R^2$ are defined as above;
or by the structural formula (Ib), in which
Hal is halogen,
Q is chosen among a chiral group in an enantiomerically pure form, of formula:
—$CHR^{10}R^{11}$ where:
$R^{10}$ is H, $C_1$–$C_5$ linear or branched alkyl; Rat is cycloalkyl, arylalkyl, aryl, optionally substituted with one or more groups chosen among: $NO_2$, CN, Cl, $CH_3$, $OCH_3$.
—CH(R13)CONH($R^{14}$) where:
$R^{13}$ is H, $C_1$–$C_5$ linear or branched alkyl, aryl, optionally substituted with $NO_2$, CN, Cl, $CH_3$, $OCH_3$, $R^{14}$ is alkylaryl, aryl, optionally substituted with one or more groups chosen among: $NO_2$, CN, Cl, $CH_3$, $OCH_3$.
—CH($R^3$)CH($R^4$)(NHR$^5$) where:
$R^3$ and $R^4$ independently of each other are $C_1$–$C_5$ linear or branched alkyl, aryl, alkylaryl, optionally substituted with $NO_2$, CN, Cl, $CH_3$, $OCH_3$, or $R^3$ forms with $R^4$ and with the carbon atoms bound to $R^3$ and $R^4$ a 5–6 term ring; $R^5$ is an aryl, benzoyl group, optionally substituted with one or more groups chosen among: $NO_2$, CN, Cl, $CH_3$, $OCH_3$.
CH[CH($R^{17}$)($R^7$)][$R^9$] where:
$R^9$ is OH, —$CHR^8R^6$ or phenyl; $R^{17}$ is H or OH; $R^7$ is H, $C_1$–$C_5$ linear or branched alkyl, or $R^7$ forms with $R^8$ and with the carbon atoms bound to $R^7$ and $R^8$ a 5–6 term ring; $R^8$ is H, $C_1$–$C_5$ linear or branched alkyl, phenyl, or $R^8$ forms with $R^6$ and with the carbon atoms bound to $R^8$ and $R^6$ a 5–6 term ring optionally of aromatic nature; $R^6$ is H, $C_1$–$C_5$ linear or branched alkyl, hydroxyl.

Within the formulas (Ia) or (Ib) it is possible to identify five subgroups of preferred selectors in which P or Q respectively have the meanings already mentioned above in the subgroups (a)–(e), in the formula (I): particularly preferred are the selectors of formula (Ia), where P has the aforesaid meaning for the subgroup (a), in the formula (I).

Figure 1A:
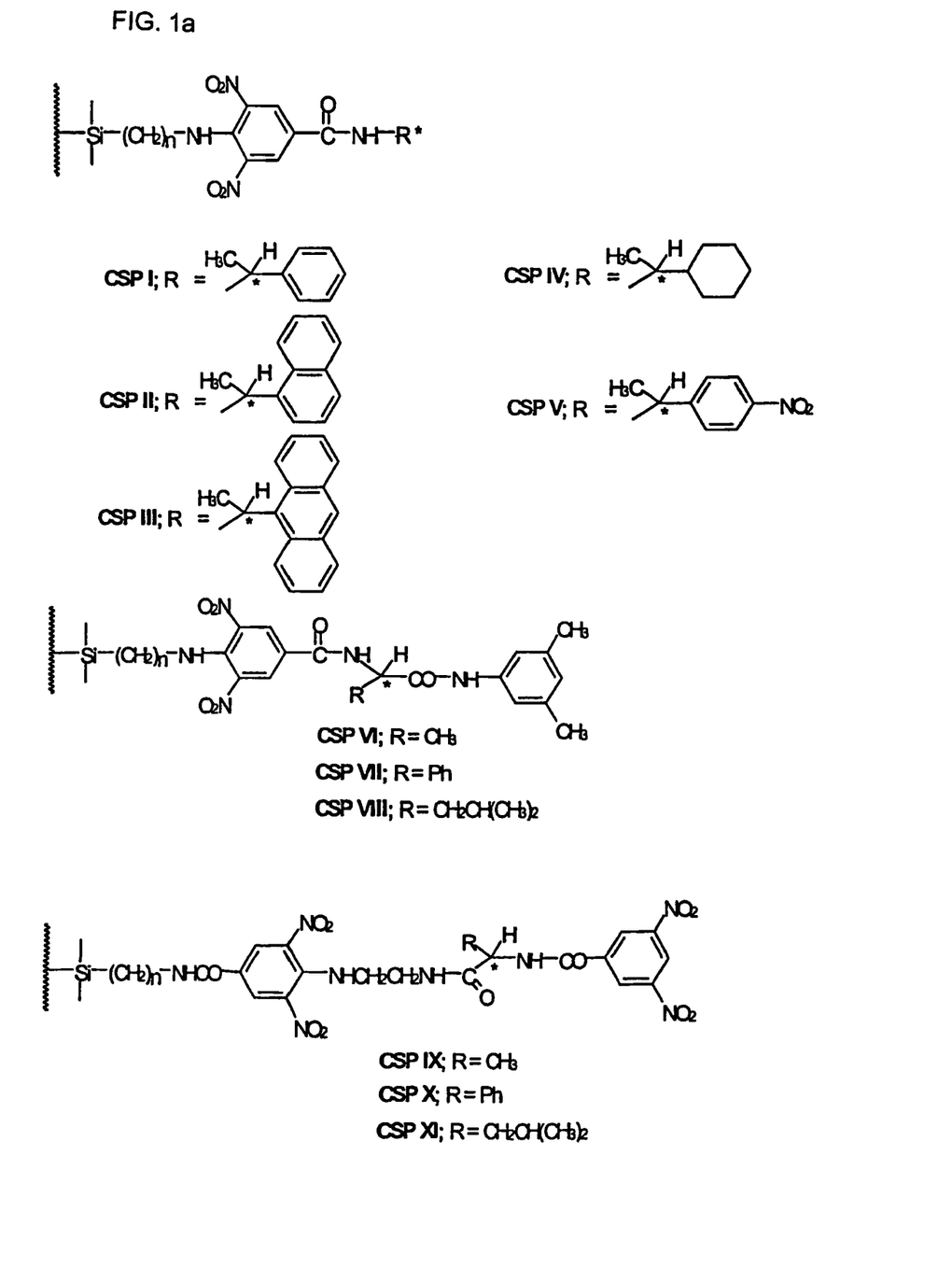
Figure 1B:
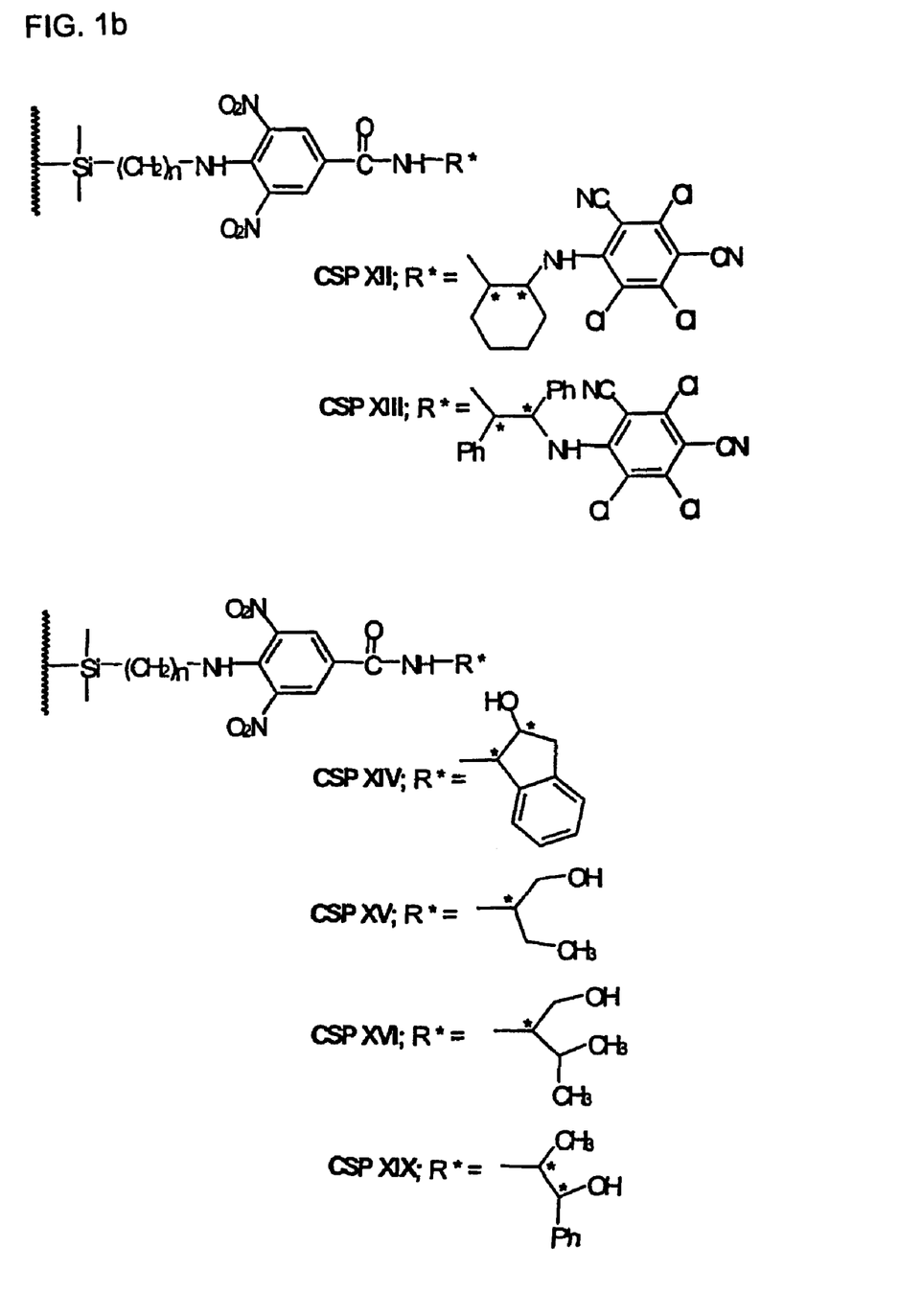

Examples of preferred selectors are listed below. The names in brackets refer to the corresponding chiral stationary phases (CSP) whose structures are shown in FIG. 1.

N-(1R)-(1-phenylethyl)(4-chloro-3,5-dinitrophenyl)carboxyamide (CSP I).

N-(1R)-(1-Naphthylethyl)(4-chloro-3,5-dinitrophenyl)carboxyamide (CSP II).

N-(1R)-(9-Anthranylethyl)(4-chloro-3,5-dinitrophenyl)carboxyamide (CSP III).

N-(1R)-(1-Cyclohexylethyl)(4-chloro-3,5-dinitrophenyl) carboxyamide (CSP IV)

N-(1R)-[1-(4-Nitrophenyl)ethyl](4-chloro-3,5-dinitrophenyl)carboxyamide (CSP V)

(2R)-N-(3,5-Dimethylphenyl)-2-[(4-chloro-3,5-dinitrophenyl)carbonylamino]propanamide (CSP VI)

(2R)-N-(3,5-Dimethylphenyl)2-[(4-chloro-3,5-dinitrophenyl)carbonylamino]-2-phenylacetamide (CSP VII)

(2R)-N-(3,5-Dimethylphenyl)-2-[(4-chloro-3,5-dinitrophenyl)carbonylamino]-2-isobutylacetamide (CSP VIII)

N-[(1R, 2R)-2-[(3,5,6-Trichloro)-2,4-dicyanophenyl)amino]cyclohexyl]-4-chloro-3,5-dinitrophenyl)carboxyamide (CSP XII)

N-[(1R,2R)-2-(2,3,5-Trichloro)-4, 6-dicyanoaniline)-1,2-diphenylethyl]-4-chloro-3,5-dinitrobenzamide (CSP XIII)

N-((2S, 1R)-2-Hydroxy-indanyl)-(4-chloro-3,5dinitrophenyl)carboxyamide (CSP XIV).

N-((1R)-1-Ethyl-2-hydroxyethyl)(4-chloro-3,5-dinitrophenyl)carboxyamide (CSP XV).

N-[(1R)-2-Hydroxy-1-(methyl)ethyl](4-chloro-3,5dinitrophenyl)carboxyamide (CSP XVI)

N-((1S, 2S)-2-Hydroxy-1-methyl-2-phenylethyl)(4-chloro-3,5-dinitrophenyl) carboxyamide (CSP XIX)

N-[(1R, 2R)-2-[(4-chloro)-3,5-dinitrobenzoyl)amino]cyclohexyl]-4-chloro-3,5-dinitrophenyl)carboxyamide (CSP XX)

The stationary phases described herein allow the separation of different racemic mixtures of commercial and industrial interest. The use of these chiral stationary phases for enantiomeric separation by chromatography, and in particular their use in the preparation of columns for liquid chromatography constitutes an additional aspect of the present invention. The term liquid chromatography includes different types of chromatography such as, for instance, high performance liquid chromatography (HPLC), batch chromatography, flash chromatography, thin layer chromatography, "simulating moving bed chromatography (SMBC), supercritical fluid chromatography (SCFC). Moreover, the present invention includes a separation method of enantiomeric mixtures through the use of said chiral stationary phases.

The present invention allows the analytical and preparative separation of classes of enantiomers having different chemical structures. In addition, it allows the determination of the enantiomeric composition of a given mixture, obtained for example with asymmetrical synthesis.

The separation process takes place through different effective interactions that occur between the chiral selector and the enantiomer.

According to the present invention the problem of the ineffectiveness or the limited efficiency in the separation of classes of racemi that is frequently found with the commercially available CSP is solved by the specific chemical structure of the new selectors of the invention. Without wishing to be bound by theory, the functional advantages of the present selectors compared to known ones appear to be due to the aromatic unit 3,5-dinitrobenzene (strong π-acid unit) interposed between the chiral group and spacer group, and where the chiral information is bound to the π-acid aromatic unit either via the amidic group in position 1 of the aromatic ring or via the amino group present on position 4 of the same ring. In a particular embodiment of the invention, these structures include a specific organization of π-acid and π-basic units (among which for example 1,3-dicyanobenzene, dimethylphenyl group), known also as π-acceptor and π-donor units, that are separated by a chiral unit so as to provide the optimum interaction with the enantiomer of the mixture. In this context, the enantioselectivity denotes a specific interaction between the chiral selector and the enantiomer to be separated, for example a situation where an enantiomer with strong (hetero)aromatic properties, has a group that interacts with the extended aromatic unit present in the chiral selector, and also contains additional functional groups to interact with other specific groups of the chiral selector.

The CSP object of the invention allow the separation of a wide number of racemic analytes which are not completely or are only partially separated by the CSP known to the state of the art.

The separation process of enantiomers according to the invention has the additional advantage of allowing the separation of numerous enantiomers without the need to derivatize them. In particular, the enantiomers that are separated are mono- and polycyclic aromatic and heteroaromatic compounds optionally containing other functional groups, such as for instance hydroxy, alkoxy, alkylthio, carboxy, carboxyalkyl, amino, alkylamino, phosphine, and phosphineoxide groups, polycyclic aromatic compounds and heteroaromatic compounds containing nitrogen, sulphur, or oxygen. The expression "heteroaromatic compounds containing nitrogen, sulphur or oxygen" includes those systems having a heterocyclic ring that contains at least one atom of nitrogen, sulphur, oxygen on the aromatic ring or on the alicyclic ring condensed to the aromatic ring or on both. This expression therefore includes saturated and unsaturated heterocycles in addition to heteroaromatic rings. All these compounds have an absolute configuration (R) or (S) and when they are prepared in the absence of a chiral intervention, such as for instance a chiral catalyst, a chiral biocatalyst, or a chiral auxiliary agent in a stechiometric amount, they are obtained in racemic form, that must inevitably be separated into the single enantiomers.

Specific separation examples of racemi by means of the stationary phases of the invention are contained in the experimental part. Particular attention is given to the separation of groups of racemi of industrial and commercial interest, such as for instance the derivatives of amino acids, of benzodiazepine, of dihydrodiazine among which for example dihydropyrimidine, derivatives of binaphthyl, phosphineoxides. The following examples illustrate the invention, in a non-limiting capacity.

Experimental Part

EXAMPLE 1

N-(1R)-(1-Phenylethyl)(4-chloro-3,5-dinitrophenyl)carboxyamide

To the solution of 4-chloro-3,5-dinitrobenzoic acid (1.00 g, 4.1 mmol) in dichloromethane (30 ml), dicyclohexylcarbodiimide (DCC, 0.84 g, 4.1 mmol) in dichloromethane (10 ml) is added. To this solution is added (R)-(+)-1-phenylethylamine (0.49 g, 4.1 mmol) in dichloromethane (10 ml). After 16 h of mixing at room temperature, the dicyclohexylurea is recovered on a filter, the filtrate is dry evaporated. 1.40 g (98%) of yellow powder are obtained, mp 202–203° C.

IR (KBr): 3340, 3280, 3090, 3080, 3040, 2980, 940, 2880, 1690, 1610, 1250, 1200, 1450, 1350, 1290, 1130, 1060, 1010, 920, 830, 760, 740, 720, 700 cm$^{-1}$. $^1$H-NMR (CDCl$_3$): 1.63 (3H, d, J=7.0 Hz), 5.28 (1H, dt, J=7.2, 7.0 Hz), 7.30–7.54 (5H, m), 8.96 (2H, s) and 9.47 (1H, d, J=7.8 Hz) ppm. $^{13}$C-NMR (CDCl$_3$): 21.96, 49.38, 121.32, 126.19, 126.94, 127.38, 128.35, 135.06, 143.88, 148.79, 160.86 ppm. Anal. elem. calculated for: C$_{12}$H$_{12}$O$_5$N$_3$Cl (mw 349.72): C 51.51, H 3.45, N 12.01%. Found: C 52.01, H 3.62, N 11.89%.

EXAMPLE 2

N-(1R)-(1-Naphthylethyl)(4-chloro-3,5-dinitrophenyl)carboxyamide

The method described in Example 1 is applied and the same molar amounts of reagents are used with the difference that (R)-(+)-naphthyl-ethyl-amine (0.70 g, 4.1 mmol) is used (instead of phenylethylamine) and 2-ethoxy-1-ethoxycarbonyl-1,2-dihydroquinoline (EEDQ) is used (instead of DCC, 1.00 g, 4.1 mmol), acylation is carried out by applying the same conditions of Example 1. The product is recovered on a G-4 filter, washed with dichloromethane and dried. 1.55 g (95%) of yellow powder are obtained, mp 127–130° C.

IR(KBr): 3600, 3380, 3230, 3120, 1790, 1700, 1600, 1495, 1210, 1070, 950, 930, 890 and 870 cm$^{-1}$. $^1$H-NMR (DMSO-d$_6$): 1.65 (3H, d, J=6.64 Hz), 5.92–5.99 (1H, m 7.33–8.76 (7H, m), 8.88 (2H, s), 9.53 (1H, d, J=7.31 Hz) ppm. $^{13}$C-NMR (DMSO-d$_6$): 21.26, 45.58, 122.81, 123.03, 125.55, 125.72, 126.41, 126.90, 127.42, 127.62, 128.78, 130.44, 133.45, 124.86, 139.38, 148.78, 160.89 ppm. Anal. elem. calculated for: C$_{19}$H$_{14}$O$_5$N$_3$Cl (mw 399.77): C 57.08, H 3.52, N 10.51%. Found: C 57.21, H 3.68, N 10.06%.

EXAMPLE 3

N-(1R)-(9-Anthranylethyl)(4-chloro-3,5dinitrophenyl)carboxyamide

The method described in Example 1 is applied, with the difference that (R)-(+)-anthranylethylamine (1.01 g, 4.1 mmol) rather than phenylethylamine is used. The product is isolated after evaporation and drying at 70° C. for 4 h. 1.18 g (64%) of product in the form of a yellow powder are obtained, mp 283–285° C.

IR KBr): 3280, 3060, 1680. 1540, 1345, 1325, 1070, 900, and 744 cm$^{-1}$. $^1$H-NMR (DMSO-d$_6$): 2.05 (3H, d, J=7.0 Hz), 6.59–6.69 (1H, m), 7.57–7.71 (4H, m), 8.20 (2H, d, J=8.0 Hz), 8.65 (2H, s), 8.83 (2H, d, J=8.0 Hz), 8.91 (2H, s), 10.02 (1H, s) ppm. $^{13}$C -NMR (DMSO-d$_6$): 20.84, 46.60, 121.61, 124.61, 124.99, 125.86, 127.49, 128.57, 129.53, 131.46, 134.76, 135.24, 148.83, ppm. Anal. elem. calculated for: C$_{23}$H$_{16}$O$_5$N$_3$Cl (mw 449.86): C 61.41, H 3.59, N 9.34%. Found: C 61.23, H 3.63, N 9.33%.

EXAMPLE 4

N-(1R)-(1-Cyclohexylethyl)(4-chloro-3,5-dinitrophenyl) carboxyamide and

N-(1R)-[1-(4-Nitrophenyl)ethyl](4-chloro-3,5-dinitrophenyl)carboxyamide

These selectors are prepared with the method described in Example 1, with the difference that (1R-1-cyclohexylethyl-amine or (1R)-1-(4-nitrophenyl)ethyl-amine is used.

EXAMPLE 5

(2R)-2-Amino-N-(3,5-dimethylphenyl)propanamide

This compound is an intermediate for the synthesis of the compound of example 6. To the solution of N-Boc-L-alanine (1.000 g, 5.28 mmol) in dichloromethane (10 ml) is added dicyclohexylcarbodiimide (DCC, 1,094 g, 5.28 mmol) in dichloromethane (10 ml). To this mixture is added 3,5-dimethylaniline (0.640 g, 5.28 mmol) in dichloromethane (10 ml). After 16 h of mixing at room temperature, the dicyclohexylurea is recovered on a filter, the filtrate is dry evaporated. 1.41 g (91%) of white powder are obtained, mp 134°–136° C. The material is dissolved in trifluoroacetic acid (5 ml) and the solution is mixed for 30 min. at room temperature. The solution is dry evaporated. The product is dissolved in methanol (10 ml). To this solution dichloromethane (30 ml) is added and the solution is washed with a solution of 1 M (30 ml) sodium carbonate and water (2×30 ml). The organic phase is dry evaporated. 0.64 g (63%) of product are obtained in the form of a brown oil.

IR(KBr): 2980, 1720, 1220, 1450, 1400, 1370, 1250, 1160, 1070, 1020, 910, 860 and 830 cm$^{-1}$. $^1$H-NMR (CDCl$_3$): 1.38 (3H, d, J=7.1 Hz), 1.62 (2H, bs), 2.28 (6H, s), 3.56 (1 H, q, J=7.1 Hz), 6.73 (1 H, s), 7.23 (2H, s), 9.39 (1 H, bs). $^{13}$C-NMR (CDCl$_3$): 20.97, 21.22, 50.87, 116.96, 125.54, 137.49, 138.42, 173.81 ppm. Anal. elem. calculated for: C$_{11}$H$_{16}$ON$_2$ (mw 192.25): C 68.71, H 8.38, N 14.57%. Found: C 68.79, H 8.51, N 14.53%.

EXAMPLE 6

(2R)-N-(3,5-Dimethylphenyl)-2-[(4-chloro-3,5-dinitrophenyl)carbonylamino] propanamide To the solution of 4-chloro-3,5-dinitrobenzoic acid (1.058 g, 4.29 mmol) and EEDQ (1.062 g, 4.29 mmol) in dichloromethane (25 ml) is added (2R)-2-amino-N-(3,5-dimethylphenyl)propanamide, prepared in Example 5 (0.825 g, 4.29 mmol) in dichloromethane (25 ml). After 16 h of mixing at room temperature the product is recovered on a G-4 filter and washed with dichloromethane (30 ml). The product is dried at 50° C. for 4 h. 1.026 g (56%) of yellowish powder are obtained, mp 202°–204° C.

IR(KBr): 3280, 3060, 1630, 1600, 1230, 1140, 1040, 970, 910, 800 and 770 cm$^{-1}$. $^1$H-NMR (CDCl$_3$): 1.76 (3H, d, J=7.0 Hz), 2.50 (6H, s), 4.92 (1H, m), 6.95 (1H, s), 7.53 (2H, s), 9.04 (2H, s), 9.59 (1H, d, J=6.8 Hz), 10.30 (1H, s) ppm. $^{13}$C-NMR (CDCl$_3$): 17.80, 21.20, 50.63, 117.28, 121.71, 127.39, 127.64, 128.46, 128.73, 130.82, 149.36, 161.73, 163.62 ppm. Anal. elem. calculated for: C$_{18}$H$_{17}$O$_6$N$_4$Cl (mw 420.79): C 51.37, H 4.07, N 13.31%. Found: C 51.42, H 4.12, N 13.28%.

EXAMPLE 7

(2R)-N-(3,5-Dimethylphenyl)-2-[(4-chloro-3,5-dinitrophenyl)carbonylamino]-2-isobutylacetamide and (2R)-N-(3,5-Dimethylphenyl)-2-[(4-chloro-3,5dinitrophenyl)carbonylamino]-2-phenylacetamide These chiral selectors are prepared from L-leucine or D-phenylglycine according to Examples 5 and 6.

EXAMPLE 8

4-{[((1R, 2R)-2-Aminocyclohexyl]amino}-2,5,6-trichloro-1,3-dicyanobenzene

To the suspension of 2,4,5,6-tetrachloro-1,3-dicyanobenzene (2.0 g, 7.52 mmol) and triethylamine (5 ml) in methyl cyanide (40 ml) is added a solution of (1R,2R)-diaminocyclohexane (0.85 g, 7.52 mmol) in methyl cyanide (10 ml). The mixture is mixed for 60 min. at 120° C., then cooled to room temperature and the water (10 ml) is slowly added. After cooling in a refrigerator the solid is recovered on a G4 filter and washed with water-methyl cyanide (1:1) and with methyl cyanide. Finally, the product is vacuum-dried on KOH tablets. 2.32 g (89%) of pale yellow powder are obtained, dec. at a temp. greater than 190° C.

IR (KBr): 3340, 3300, 3120, 2960, 2920, 2860, 2220, 1600, 1280, 1480, 1450, 1400, 1360, 1350, 1270, 1240, 1220, 1190, 1100, 1070, 1040, 990, 930, 900, 870, 850, 840, 740, 730 and 610 cm$^{-1}$. $^1$H NMR (CF$_3$COOD): 1.16–2.25 (8H, m), 3.45 (1H, m) and 4.37 (1H, m) ppm. $^{13}$C NMR (CF$_3$COOD): 22.26, 29.04, 32.58, 55.26, 57.12, 96.12, 104.96, 110.54, 112.77, 122.43, 141.53, 142.47, 120.57 ppm. Anal. elem. calculated for: C$_{14}$H$_{13}$N$_4$Cl$_3$ (mw 343.63): C 48.93%, H 3.81%, and N 16.30%. Found: C 48.77%, H 4.01% the N 16.35%.

EXAMPLE 9

N-[(1R, 2R)-2-[(3,5,6-Trichloro)-2,4-dicyanophenyl)amino]cyclohexyl}-4-chloro-3,5-dinitrophenyl)carboxyamide The solution of 4-chloro-3,5-dinitrobenzoic acid (0.72 9, 2.90 mmol) and EEDQ (0.72 g, 2.90 mmol) in dichloromethane (20 ml) is mixed for 60 min. at room temperature, then is added 4-{[(1R,2R)-2-aminocyclohexyl]amino}-2,5,6-trichloro-1,3-dicyanobenzene (1.00g, 2.90 mmol) and dichloromethane (5 ml). After 24 h of mixing at room temperature the product is recovered on a G-4 filter and then washed with dichloromethane. Through vacuum drying on KOH tablets, 1.12 g (69%) of product are obtained in the form of a pale yellow powder, mp 201–204 ° C.

IR (KBr): 3420, 3160, 3020, 2940, 2320, 1680, 1640, 1260, 1200, 1490, 1400, 1360, 1290, 1240, 1200, 1140, 1110, 1100, 1020, 975, 950, 940, 790 and 760 cm$^{-1}$. $^1$H NMR (DMSO-d$_6$): 1.01–2.66 (8H, m), 4.16–4.25 (2H, m), 7.05 (1H, d, J=3.1 Hz), 8.49 (2H, d, J=2.99 Hz) and 8.77 (1H, bs) ppm. $^{13}$C NMR (DMSO-d$_6$): 24.28, 24.51, 31.85, 32.02, 53.97, 60.26, 97.08, 113.40, 114.64, 119.97, 121.85, 126.80, 127.95, 134.71, 138.14, 140.98, 148.66, 121.48, 161.50 ppm. Elem. anal. calcd for C$_{21}$H$_{14}$N$_6$O$_5$Cl$_4$ (mw 572.18): C 44.07%, H 2.46%, N 14.69%. Found: C 44.31%, H 2.87%, N 14.65%.

EXAMPLE 10

N-[(1R,2R)-2-(2,3,5-Trichloro)-4,6dicyanoaniline)-1,2-diphenylethyl]-4-chloro-3,5-dinitrobenzamide This selector is prepared as described in Examples 8 and 9, with the difference that (1R,2R) 1,2-diphenylethane-1,2-diamine is used.

EXAMPLE 11

N-((2S, 1R)-2-Hydroxy-indanyl)-(4chloro-3,5dinitrophenyl)carboxyamide

To the solution of 4-chloro-3,5-dinitrobenzoic acid (0.500 g; 2.02 mmol) and EEDQ (0.501 g; 2.02 mmol) in anhydrous tetrahydrofurane (12 ml), a solution of (1S,2R)-(–)-cis-1-amino-2-indanol (0.302 g; 3.38 mmol) in anhydrous tetrahydrofurane (12 ml) is added. The mixture is mixed for 16 h at room temperature and is then dry evaporated. The dry residue is suspended in dichloromethane (20 ml), the solid product is recovered on a GA4 filter and washed with dichloromethane. The product is dried at 50° C. for 4 h, 0.59 g (77%) of yellowish powder are obtained, m.p. 218–219° C.

IR (KBr): 3240, 3050, 2880, 1630, 1220, 1340, 1280, 1050, 960, 900 and 730 cm$^{-1}$. $^1$H NMR (DMSO-d$_6$): 2.87 (1H, d, J=16.1 Hz), 3.10 (1H, dd, J=16.1, 7.0 Hz), 4.23 (1H, bs), 4.54 (1H, s), 5.40–5.51 (1H, m), 7.11–2.26 (4H, m), 8.92 (2H, s), and 9.12 (1H, d, J=8.6 Hz) ppm. $^{13}$C NMR (DMSO-d$_6$): 39.88, 58.36, 72.26, 121.08, 124.75, 124.95, 126.40, 127.72, 127.84, 135.44, 140.93, 141.33, 148.67, 162.54 ppm. Elem. anal. calcd. for C$_{16}$H$_{12}$O$_6$N$_3$Cl (mw 377.7342): C 50.87%, H 3.20%, N 11.12%. Found: C 50.94, H 3.28, and N 11.08%.

EXAMPLE 12

N-((1R)-1-Ethyl-2-hydroxyethyl)-(4chloro-3,5-dinitrophenyl)carboxyamide,

N-[(1R)-2-Hydroxy-1-(methylethyl)ethyl](4chloro-3,5-dinitrophenyl)carboxyamide,

N-((1S,2S)-2-Hydroxy-1-methyl-2-phenylethyl)(4-chloro-3,5dinitrophenyl)carboxyamide These chiral selectors are prepared from chiral amino alcohols according to the method of Example 11.

EXAMPLE 13

Chiral Stationary Phase CSP-I

A mixture of the chiral selector of Example 1 (0.60 g, 1.50 mmol) and Nucleosil 100-5NH$_2$ (3.0 g; C 3.49%, N 1.36%) in DMF (12 ml) is mixed for 24 h at room temperature. The chiral stationary phase obtained is recovered on a G-4 filter, washed with DMF and MeOH, and dried at 50° C. for 6 h. 3.33 g of product are obtained. Elem. anal., Found: C 7.41, H 2.76, N 2.23%. 1.0 g of chiral stationary phase contains c. 0.21 mmol of bound selector, based on the percentage of C.

EXAMPLE 14

Chiral Stationary Phase CSP-II

The chiral stationary phase CSP-II is prepared from the chiral selector of Example 2 (0.599 g, 1.50 mmol) and Nucleosil 100-5NH$_2$ (3.0 g) according to the procedure of Example 13. 3.34 g of product are obtained; elem. anal., Found: C 7.62, H 2.34, N 1.97%. 1.0 g of CSP-II contains c. 0.16 mmol of bound selector, based on the percentage of C.

EXAMPLE 15

Chiral Stationary Phase CSP-III

The chiral stationary phase CSP-III is prepared from the chiral selector of Example 3 (0.53 g, 1.50 mmol) and Nucleosil 100-5NH$_2$ (3.0 g) according to the procedure of Example 13. 3.29 g of product are obtained; elem. anal., Found: C 7.41, H 2.81, N 2.25%. 1.0 g of chiral stationary phase IIII contains c. 0.21 mmol of bound selector, based on the percentage of C.

EXAMPLE 16

Chiral Stationary Phases CSP-IV and CSP-V

These stationary phases are prepared from the chiral selectors of Example 4 with the method of Example 13.

EXAMPLE 17

Chiral stationary phase CSP-VI

The chiral stationary phase CSP-VI is prepared from the chiral selector obtained in Example 6 (0.631 g, 1.50 mmol) and Nucleosil 100-5NH$_2$ (3.0 g) according to the procedure of Example 13. 3.24 g of product are obtained; elem. anal., Found: C, 7.26; H 1.42, N 1.61%. 1.0 g of CSP-VI contains ca. 0.22 mmol of bound selector, based on the percentage of C.

EXAMPLE 18

Chiral Stationary Phases CSP-VII and CSP-VIII

These stationary phases are prepared from the chiral selectors of Example 7 according to the method of Example 17.

EXAMPLE 19

Chiral Stationary Phase CSP-X

A mixture of 4-chloro-3,5-dinitrobenzoic acid (0.612 g, 2.49 mmol), EEDQ (0.617 g, 2.49 mmol) and silica gel Nucleosil 100-5NH$_2$ (2.572 g) in anhydrous tetrahydrofurane (12 ml) is mixed for 18 h at room temperature. The modified silica gel is recovered on a G-4 filter, washed with tetrahydrofurane and methanol, and dried at 70° C. for 4 h. The material (2.78 g) is suspended in dichloromethane (12 ml) then ethylenediamine (3 ml) is added. The suspension is mixed for 1 h at room temperature and the product is recovered on a GA filter. The modified silica thus obtained is washed with dichloromethane and methanol and dried at 70° C. for 4 h. A mixture of the material (2.800 g), N-(3,5-dinitrobenzoyl)-D-phenylglycine (0.464 g, 1.34 mmol) and EEDQ (0.332 g, 1.34 mmol) in anhydrous tetrahydrofurane (10 ml) is mixed for 24 h at room temperature. The chiral stationary phase is recovered on a G-4 filter, washed with tetrahydrofurane and methanol and dried at 70° C. for 4 h. 2.98 g of product are obtained; elem. anal., Found: C, 11.14%; H, 1.44%, N, 2.99%. 1.0 g of stationary phase contains ca. 0.28 mmol of bound selector, based on the percentage of C.

EXAMPLE 20

Chiral Stationary Phases CSP-IX and CSP-XI

These stationary phases are prepared from N-(3,5-dinitrobenzoyl)-L-alanine and N-(3,5-dinitrobenzoyl)-L-leucine with the method of Example 19.

EXAMPLE 21

Chiral Stationary Phase CSP-XII

The chiral stationary phase CSP-XII is prepared from the chiral selector of Example 9 (0.858 g, 1.50 mmol) and Nucleosil 100-5NH$_2$ (3.0 g) according to Example 13. 3.30 g of product are obtained; elem. anal., Found: C 7.28, H 1.95, N 2.55, Cl 2.84%. 1.0 g of chiral stationary phase contains ca. 0.27 mmol of bound selector, based on the percentage of C.

EXAMPLE 22

Chiral Stationary Phase CSP-XIII

This stationary phase is prepared as described in Example 21, with the difference that the chiral selector of Example 10 is used.

EXAMPLE 23

Chiral Stationary Phase CSP-XIV

The chiral stationary phase CSP-XIV is prepared from the chiral selector of Example 11 (0.566 g, 1.50 mmol) and Nucleosil 100-5NH$_2$ (3.0 g) according to Example 13. 3.26 g of product are obtained; elem. anal., Found: C 6.90, H 1.23, N 1.57%. 1.0 g of chiral stationary phase contains ca. 0.21 mmol of bound selector, based on the percentage of C.

EXAMPLE 24

Chiral Stationary Phases CSP-XV-CSP-XIX

These stationary phases are prepared from the chiral selectors of Example 12 according to the method of Example 23.

Examples of Separation of Racemic Mixtures With the Chiral Stationary Phases of the Invention (Examples 25–36)

General procedure applied in Examples 25–36 for the separation of racemic mixtures using HPLC columns containing the chiral stationary phases of the invention.

Figure 2A:
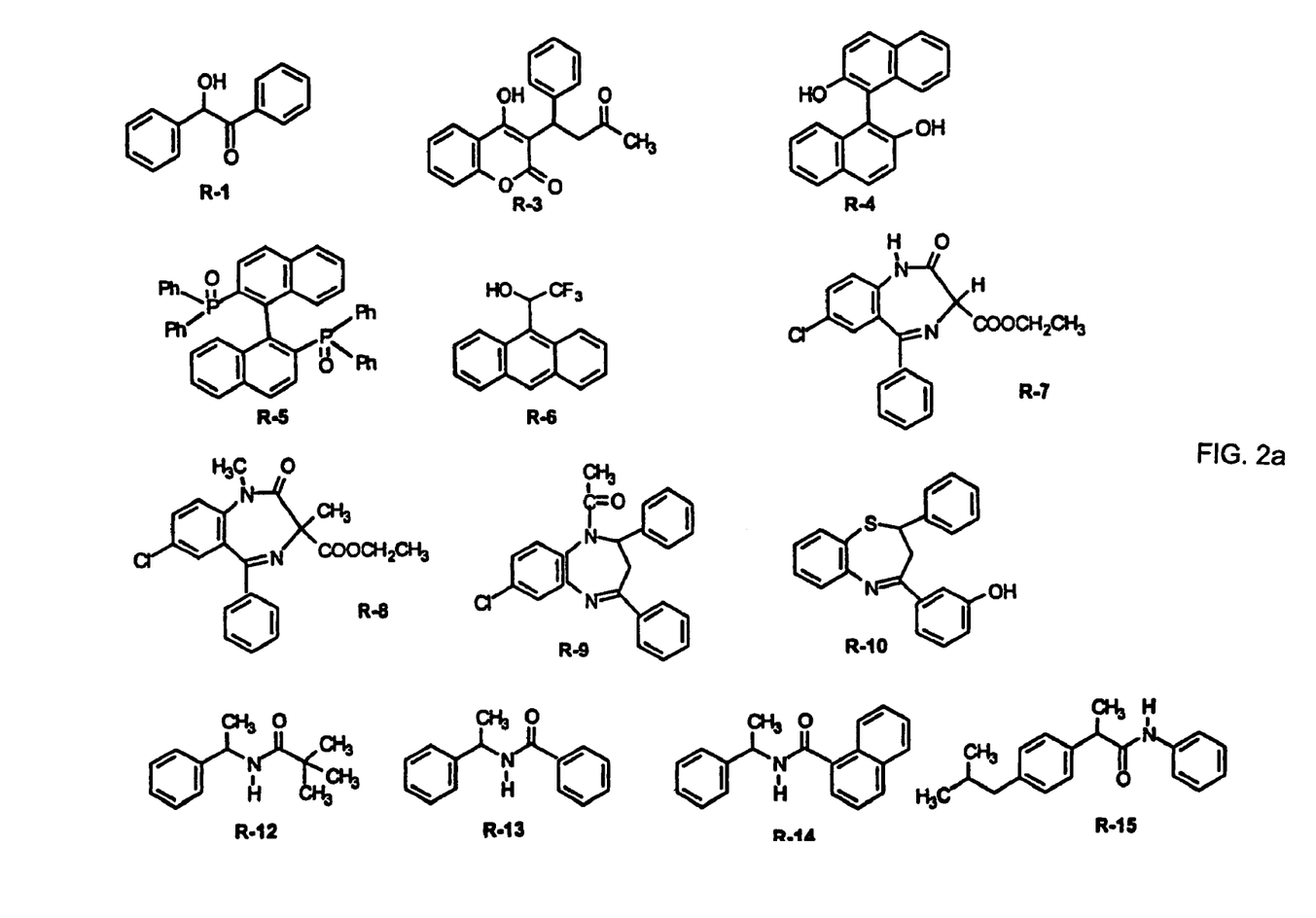
FIGS. 2*a* and 2*b*: List of racemi tested
Figure 2B:
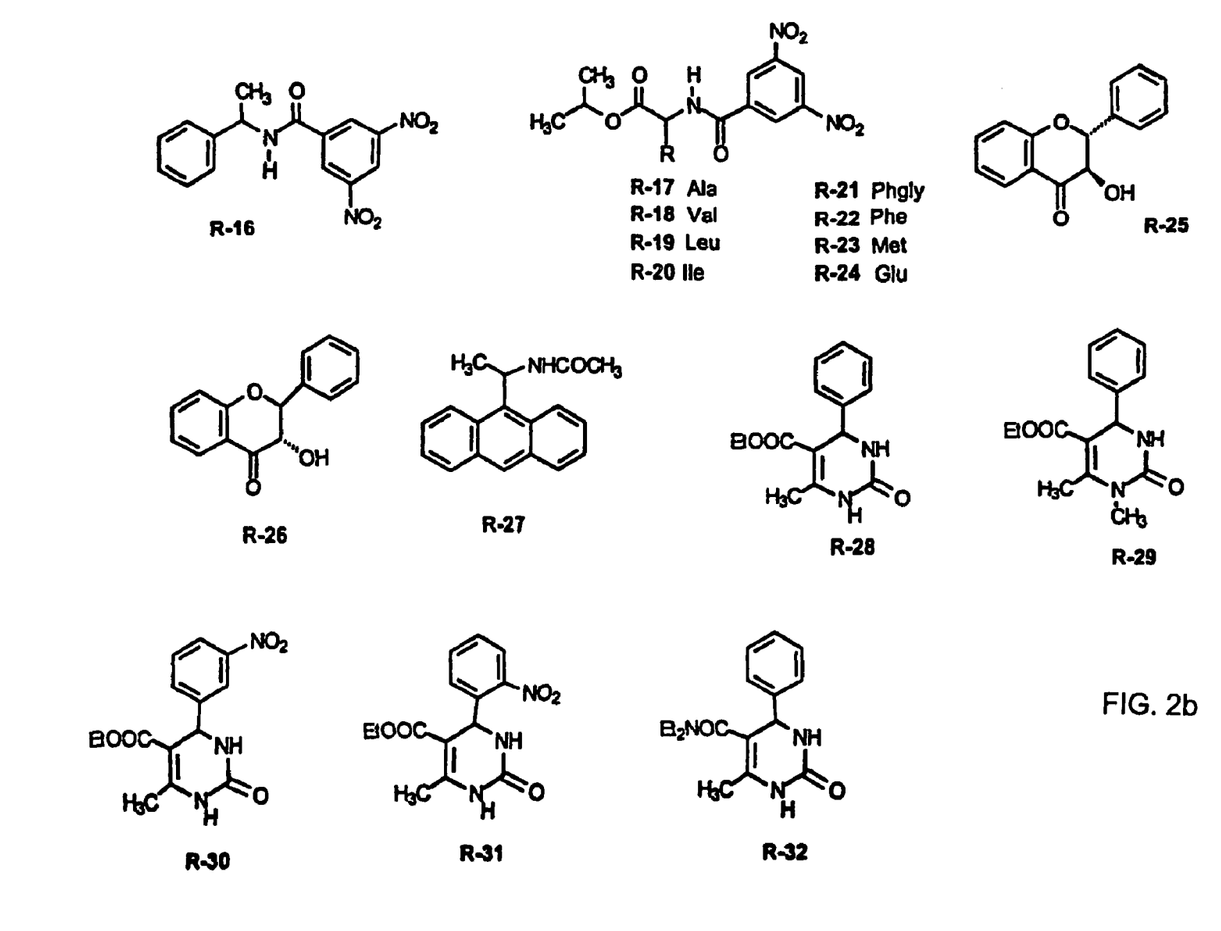

A Knauer WellChrom. Maxi-Star K-1000 pump is used (Knauer GmbH, Berlin, Germany) with a Knauer HPLC 6-port-valve injector and a 20 µl loop. The measurement is taken at 254 nm with a Knauer WellChrom K-2500 detector. Integration of the peaks of the chromatograms is performed with the BDS software package (Barspec Ltd., Rehovot, Israel). The packing of the HPLC columns, acquired from Max Stevenson (Berlin, Germany, dimensions 150×4.6 mm) is performed with the "slurry" technique using a pneumatic pump for Knauer HPLC. The n-hexane, 2-propanol, dichloromethane and other solvents used for HPLC with analytical purity of J. T. Baker, are redistilled before use. The dead volume of the column was measured with 1,3,5-tri-tert-butylbenzene. The structures of the tested racemi are shown in FIG. 2.

EXAMPLE 25

Separation of Racemic Mixtures of Derivatives of Amino Acids (R-17-R-24) With CSP-II, CSP XIV, CSP VI The chromatographic columns for HPLC are filled with the CSP and different racemic mixtures of derivatives of amino acids are separated. The mobile phase utilized is 20% of 2-propanol in n-hexane with a flow of 1.0 mlmin. The two enantiomers of each mixture are resolved and the chromatogram has two separate symmetrical peaks with separation factor ($\alpha$) and resolution factor ($R_s$) shown in Table 1.

TABLE 1

|  | CSP II |  | CSP XIV |  | CSP VI |  |
|---|---|---|---|---|---|---|
|  | $\alpha$ | $R_S$ | $\alpha$ | $R_S$ | $\alpha$ | $R_S$ |
| R-17 | 1.36 | 2.08 | 1.24 | 2.41 | 2.28 | 12.78 |
| R-18 | 1.62 | 3.80 | 1.30 | 2.57 | 2.32 | 13.22 |
| R-19 | 1.79 | 4.00 | 1.26 | 2.46 | 3.72 | 25.28 |
| R-20 | 1.61 | 3.31 | 1.29 | 3.05 | 2.64 | 18.22 |
| R-21 | 1.26 | 2.33 | 1.31 | 3.29 | 1.88 | 9.65 |
| R-22 | 1.36 | 2.83 | 1.30 | 3.06 | 2.84 | 21.41 |
| R-23 | 1.59 | 4.55 | 1.31 | 3.22 | 2.68 | 10.37 |
| R-24 | 1.41 | 2.47 | 1.16 | 1.62 | 2.12 | 9.12 |

Representative compounds of derivatives of amino acids are successfully separated by means of different CSP. In particular, the very good separation of R-19 with CSP-VI is highlighted.

EXAMPLE 26

Separation of Racemic Mixtures of Dihydropyrimidine (R-28-R-32) With CSP-VI, CSP III, CSP XIV The chromatographic columns for HPLC are filled with the CSP and different racemic mixtures of drugs used in controlling blood pressure are separated using n-hexane/2-propanol/acetic acid (80:20:1) as a mobile phase at a flow of 1.0 ml/min. The two enantiomers of each mixture are resolved and the chromatogram has two separate symmetrical peaks with separation factor ($\alpha$) and resolution factor ($R_s$) shown in Table 2.

TABLE 2

|  | CSP VI |  | CSP III |  | CSP XIV |  |
|---|---|---|---|---|---|---|
|  | $\alpha$ | $R_S$ | $\alpha$ | $R_S$ | $\alpha$ | $R_S$ |
| R-28 | 1.20 | 2.49 | 1.10 | 1.21 | 1.17 | 1.32 |
| R-29 | 1.18 | 2.18 | 1.08 | 1.07 | 1.09 | 0.69 |
| R-30 | 1.25 | 3.11 | 1.13 | 1.82 | 1.12 | 1.11 |
| R-31 | 1.12 | 1.98 | 1.00 | 0 | 1.18 | 1.94 |
| R-32 | 1.02 | nm | 1.04 | 0.52 | 1.17 | 1.82 |

Very effective separations were obtained for different racemic mixtures belonging to this class of drugs.

EXAMPLE 27

Separation of Racemic Mixtures With CSP-II

The two enantiomers of each mixture are resolved and the chromatogram has two separate symmetrical peaks with separation factor ($\alpha$), resolution factor ($R_s$) retention time of the enantiomer R1 and R2 ($t_{R1}$, $t_{R2}$) and capacity factors ($k'_1$, $k'_2$) shown in Table 3. The mobile phase utilized is 20% of 2-propanol in n-hexane with a flow of 1.0 ml/min.

TABLE 3

|  | $t_{R1}$ | $t_{R2}$ | $k'_1$ | $k'_2$ | $\alpha$ | $R_S$ |
|---|---|---|---|---|---|---|
| R-12 | 3.85 | 4.08 | 0.53 | 0.62 | 1.17 | 0.92 |
| R-13 | 6.42 | 6.90 | 1.83 | 2.04 | 1.11 | 1.07 |
| R-14 | 9.35 | 9.85 | 3.12 | 3.34 | 1.07 | 0.66 |
| R-16 | 12.78 | 17.63 | 4.63 | 6.76 | 1.46 | 4.20 |

From these data it can be deduced that the stationary phase CSP-II allows an excellent separation not only of DNB derivatives of amino acids, as seen in Example 26, but also of compounds containing other amidic groups.

EXAMPLE 28

Separation of Racemic Mixtures With CSP-III

The two enantiomers of each mixture are resolved and the chromatogram has two separate symmetrical peaks with separation factor ($\alpha$), resolution factor ($R_s$) retention time of the enantiomer R1 and R2 ($t_{R1}$, $t_{R2}$) and capacity factors ($k'_1$, $k'_2$) shown in Table 4. The mobile phase utilized is 1% of methanol in n-hexane/dichloromethane (100:30) with a flow of 1.0 ml/min.

TABLE 4

|  | $T_{R1}$ | $t_{R2}$ | $k'_1$ | $k'_2$ | $\alpha$ | $R_S$ |
|---|---|---|---|---|---|---|
| R-6 | 12.00 | 16.10 | 3.64 | 4.1 | 1.13 | 1.38 |
| R-8 | 7.80 | 8.05 | 1.41 | 1.49 | 1.10 | 0.42[a] |
| R-9 | 25.50 | 26.72 | 6.89 | 7.27 | 1.06 | 0.76 |
| R-10 | 6.47 | 6.63 | 1.00 | 1.10 | 1.10 | 0.29[a] |
| R-12 | 10.62 | 11.12 | 2.29 | 2.44 | 1.07 | 1.00 |
| R-16 | 48.12 | 67.03 | 13.89 | 19.75 | 1.42 | 2.70 |
| R-18 | 18.02 | 19.50 | 4.80 | 5.04 | 1.10 | 1.35 |
| R-19 | 21.03 | 22.12 | 5.51 | 5.86 | 1.06 | 0.97 |
| R-21 | 35.97 | 40.62 | 10.14 | 11.58 | 1.14 | 2.33 |
| R-22 | 27.02 | 28.68 | 7.37 | 7.88 | 1.07 | 1.38 |
| R-23 | 38.73 | 41.32 | 10.88 | 11.79 | 1.08 | 1.36 |
| R-25 | 9.83 | 11.08 | 2.04 | 2.43 | 1.19 | 1.67 |

[a]mobile phase: n-hexane/2-propanol (8:2).

From these data it can be deduced that the stationary phase CSP-III allows the separation of various structurally different racemic mixtures.

EXAMPLE 29

Separation of Racemic Mixtures With CSP-XII

The two enantiomers of each mixture are resolved and the chromatogram has two separate symmetrical peaks with separation factor ($\alpha$), resolution factor ($R_s$) retention time of the enantiomer R1 and R2 ($t_{R1}$, $t_{R2}$) and capacity factors ($k'_1$, $k'_2$) shown in Table 5.

TABLE 5

|  | $t_{R1}$ | $t_{R2}$ | $K'_1$ | $k'_2$ | $\alpha$ | $R_S$ |
|---|---|---|---|---|---|---|
| R-3[a] | 17.07 | 19.05 | 4.69 | 5.35 | 1.14 | 1.27 |
| R-5[b] | 27.93 | 31.12 | 6.35 | 7.18 | 1.13 | 0.94 |
| R-7[c] | 12.37 | 18.72 | 4.12 | 5.24 | 1.27 | 2.43 |
| R-12[d] | 6.93 | 7.67 | 1.31 | 1.56 | 1.19 | 1.27 |
| R-13[d] | 12.65 | 19.35 | 4.22 | 5.45 | 1.29 | 4.11 |
| R-16[d] | 17.05 | 20.95 | 4.68 | 5.98 | 1.28 | 3.79 |
| R-17[d] | 9.27 | 10.12 | 2.09 | 2.37 | 1.13 | 1.09 |

TABLE 5-continued

|  | $t_{R1}$ | $t_{R2}$ | $K'_1$ | $k'_2$ | α | $R_S$ |
|---|---|---|---|---|---|---|
| R-27[c] | 13.77 | 16.68 | 3.59 | 4.56 | 1.27 | 2.37 |
| R-31[c] | 11.60 | 12.80 | 2.87 | 3.27 | 1.14 | 1.07 |

[a]Mobile phase: 98% n-hexane/2-propanol (8:2), 2% acetic acid; 1 ml/min.
[b]Mobile phase: n-hexane/2-propanol (9:1); 2 ml/min.
[c]Mobile phase: 99% n-hexane/2-propanol (9:1), 1% acetic acid; 1 ml/min.
[d]Mobile phase: n-hexane/2-propanol (8:2); 1 ml/min.

EXAMPLE 30

Separation of Warfarin (R-3) With CSP-III

The warfarin (R-3) is successfully separated using n-hexane/2-propanol/acetic acid (80:20:1) as a mobile phase, at a flow of 1.0 ml/min. The two enantiomers are separated with α=1.24, $R_s$=4.09, $t_{R1}$=14.12 min. and $t_{R2}$=16.33 min.

EXAMPLE 31

Separation of 3,5-dinitrobenzoyl-leucine (R-19) With CSP-VI

The two enantiomers of 3,5-dinitrobenzoyl-leucine are separated with $t_{R1}$=7.18 min. and $t_{R2}$=25.87 min. using n-hexane/dichloromethane/methanol (100:30:1) as a mobile phase, at a flow of 2.0 ml/min.

EXAMPLE 32

Separation of Racemic Mixtures of 2,2'-bis(diphenylphosphine)-1,1'-binaphthalene (R-5, BINAPO) With CSP-X An extraordinary separation of BINAPO (R-5) is obtained with CSP-X using n-hexane/2-propanol (50:50) as a mobile phase, at a flow of 2.0 ml/min. The two enantiomers are separated with α=2.37, $R_s$=3.88, $t_{R1}$=6.0 min. and $t_{R2}$=11.87 min. This process could be of use also for the separation and the analysis of the BINAP catalyst (2,2'-bis(diphenylphosphinil)-1,1'-binaphthalene), a much used catalyst, since BINAP is easily oxidized to BINAPO without racemizing, and BINAPO is also easily reduced again to BINAP

EXAMPLE 33

Separation of Benzodiazepine (R-7) With CSP-XIV

The racemic mixture R-7 is separated using n-hexane/dichloromethane/methanol (100:30:1) as a mobile phase, at a flow of 2.0 ml/min. The two enantiomers are separated with $t_{R1}$ 36.82 min. and $t_{R2}$ 43.20 min.

EXAMPLE 34

Separation of R-4 With CSP-XI

The racemic mixture is separated using n-hexane/dichloromethane/methanol (100:30:1) as a mobile phase, at a flow of 1.0 ml/min. The two enantiomers are separated with α=1.20, $R_s$=2.35

EXAMPLE 35

Separation of R-1 With CSP-VI and CSP-IX

The two enantiomers of the mixture are resolved and the chromatogram has two separate symmetrical peaks with separation factor (α), resolution factor ($R_s$) shown in Table 6.

TABLE 6

|  | α | $R_S$ |
|---|---|---|
| CSP-VI[a] | 1.05 | 0.49 |
| CSP-IX[b] | 1.05 | 0.43 |

[a]Mobile phase: n-hexane/2-propanol (9:1); 1 ml/min.
[b]Mobile phase: n-hexane/dichloromethane/methane (100:30:1); 1 ml/min.

EXAMPLE 36

Separation of R-26 With CSP-XIV

The racemic mixture is separated using n-hexane/2-propanol (9:1) as a mobile phase, at a flow of 1.0 m/min. The two enantiomers are separated with α=1.10, $R_s$=1.03. The data shown here highlight that the chiral stationary phases of the invention allow the efficient separation of a wide range of racemic analytes. Of particular significance, among the analytes separated, are those denoted by R-1, R-5 (BINAPO), R-25, R-26, R-28, R-29, R-30, R-31, R-32 (see FIG. 2): such analytes were not separable either by commercial stationary phases based on 3,5-DNB derivatives (in particular, by the derivative of phenylglycine, Chiral-2, Macherey Nagel)), or by those based on derivatives of 1,3-dicyanobenzene. Therefore, the CSP according to the invention, besides having a broad general spectrum of use, have for the first time allowed the separation of a high number of analytes not yet separable by means of known CSP.

What is claimed is:
1. Chiral stationary phase represented by the structure (I):

in which:
P is:
(i): a chiral group in an enantiomerically pure form, chosen between:
—$(CH_2)_n$NHCOCH($R_1$)NH($R_2$) where:
n ranges from 2 to 4, $R_1$ is $C_1$–$C_5$ linear or branched alkyl, aryl; $R_2$ is COAr or Ar, where Ar is an aryl or alkylaryl group, optionally substituted with one or more groups chosen among: $NO_2$, CN, Cl, $CH_3$, $OCH_3$
—COCH($R_1$)NH($R_2$) where:
$R^1$ and $R^2$ are defined as above;
(ii) or P is a spacer group covalently bound to a solid support for chromatography Q is:

(i) a chiral group in an enantiomerically pure form, chosen among:

—CHR$^{10}$R$^{11}$ where:

R$^{10}$ is H, C$_1$–C$_5$ linear or branched alkyl; R$^{11}$ is cycloalkyl, arylalkyl, aryl, optionally substituted with one or more groups chosen among: NO$_2$, CN, Cl, CH$_3$, OCH$_3$ —CH(R$^{13}$)CONH(R$^{14}$) where:

R$^{13}$ is H, C$_1$–C$_5$ linear or branched alkyl, aryl, optionally substituted with NO$_2$, CN, Cl, CH$_3$, OCH$_3$; R$^{14}$ is alkylaryl, aryl, optionally substituted with one or more groups chosen among: NO$_2$, CN, Cl, CH$_3$, OCH$_3$ —CH(R$^3$)CH(R$^4$)(NHR$^5$) where:

R$^3$ and R$^4$ independently of each other are C$_1$–C$_5$ linear or branched alkyl, aryl, alkylaryl, optionally substituted with NO$_2$, CN, Cl, CH$_3$, OCH$_3$, or R$^3$ forms with R$^4$ and with the carbon atoms bound to R$^3$ and R$^4$ a 5–6 term ring; R$^5$ is an aryl, benzoyl group, optionally substituted with one or more groups chosen among: NO$_2$, CN, Cl, CH$_3$, OCH$_3$.

(ii) or Q is a spacer group covalently bound to a solid support for chromatography, and in which the aforesaid formula (I) always contains one chiral group and one spacer group bound to a solid support for chromatography, as defined above.

2. Stationary phase according to claim 1, where P is a chiral group and Q is a spacer group bound to a solid support for chromatography.

3. Stationary phase according to claim 1, where the alkylaryl groups are represented by the benzyl group.

4. Stationary phase according to claim 1, where the aryl groups are represented by phenyl, naphthyl, 2,5,6-trichloro-1,3-dicyanophenyl or 4,5,6-trichloro-1,3-dicyanophenyl.

5. Stationary phase according to claim 1, where
P is —(CH$_2$)$_n$NHCOCH(R$^1$)NH(R$^2$), n is 2; R$^1$ is methyl, isopropyl, isobutyl, phenyl, benzyl; R$^2$ is 3,5-dinitrobenzoyl, 2,5,6-trichloro-1,3-dicyanophenyl, 4,5,6-trichloro-1,3-dicyanophenyl.

6. Stationary phase according to claim 1, where
Q is —CHR$^{10}$R$^{11}$, R$^{10}$ is methyl; R$^{11}$ is cyclohexyl, phenyl, naphthyl, anthranyl, 2,5,6-trichloro-1,3-dicyanophenyl, 4,5,6-trichloro, 1,3-dicyanophenyl, paranitrophenyl.

7. Stationary phase according to claim 1, where
Q is —CH(R$^{13}$)CONH(R$^{14}$), R$^{13}$ is methyl, phenyl, isobutyl; R$^{14}$ is phenyl, dimethylphenyl.

8. Stationary phase according to claim 1, where
Q is —CH(R$^3$)CH(R$^4$)(NHR$^5$), R$^3$ and R$^4$ are phenyl or R$^3$ forms with R$^4$ and with the carbon atoms bound to R$^3$ and R$^4$ a 6-term ring; R$^5$ is 4,5,6-trichloro-1,3-dicyanophenyl, 2,4,6-trichloro-1,3-dicyanophenyl.

9. Stationary phase according to claim 1, where the spacer group covalently bound to a solid support for chromatography has the formula —(CH$_2$)$_n$—Si—(R$^{12}$)(R$^{16}$)—O—R$^{15}$, where n ranges from 1 to 10; R$^{12}$ and R$^{16}$ are C$_1$–C$_4$ alkyl, C$_1$–C$_4$ alkoxy, O—R$^{15}$, and R$^{15}$ represents the solid support for chromatography.

10. Stationary phase according to claim 9, where R$^{12}$ is the same as R$^{16}$ and represents ethoxy, n is 3, and R$^{15}$ is a silyl residue of silica, or R$^{12}$ is ethoxy and R$^{16}$ is —OR$^{15}$, and R$^{15}$ is a silyl residue of silica.

11. Stationary phase according to claim 1, where the solid support is of inorganic nature.

12. Stationary phase according to claim 1, where the solid support is chosen among silica gel, alumina, kaolin, titanium oxide, magnesium oxide, silicate, synthetic polymers.

13. Process for the production of the chiral stationary phases described in claim 1 including the following steps, applicable in any order:
- introduction of a chiral group (P or Q) on the ring of a 4-halo-3,5-dinitro-benzoic acid;
- introduction of a spacer group (Q or P) on the ring of the 4-halo-3,5-dinitro-benzoic acid;
- formation of a covalent bond between the spacer group and the solid support.

14. Process according to claim 13, wherein said 4-halo is 4-chloro.

15. Process according to claim 13, in which the spacer group is made to react first with the solid support and then with 4-chloro-3,5-dinitro-benzoic acid.

16. A method for the analytical or preparative separation of enantiomers characterised by eluting said enantiomers through a chiral stationery phase as described in claim 1.

17. Method according to claim 16, where the separation is carried out by liquid chromatography, HPLC, SMBC, SCFC.

* * * * *

UNITED STATES PATENT AND TRADEMARK OFFICE
CERTIFICATE OF CORRECTION

| | | |
|---|---|---|
| PATENT NO. | : 7,018,537 B2 | Page 1 of 1 |
| APPLICATION NO. | : 10/469899 | |
| DATED | : March 28, 2006 | |
| INVENTOR(S) | : Darko Kontrec et al. | |

It is certified that error appears in the above-identified patent and that said Letters Patent is hereby corrected as shown below:

Col. 20, Lines 59, 60 and 64 - Change "($R_1$)" to -- ($R^1$) --.

Col. 20, Lines 59, 61 and 64 – Change ($R_2$)" to -- ($R^2$) --.

Col. 22, Line 40 – Change "stationery" to -- stationary --.

Signed and Sealed this

Fifteenth Day of August, 2006

JON W. DUDAS
*Director of the United States Patent and Trademark Office*